(12) United States Patent
Choi

(10) Patent No.: US 6,707,491 B1
(45) Date of Patent: Mar. 16, 2004

(54) METHOD OF CORRECTING WHITE BALANCE IN VIDEO CAMERA

(75) Inventor: Ki Young Choi, Kyungki-do (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 09/379,326

(22) Filed: Aug. 23, 1999

(30) Foreign Application Priority Data

Aug. 28, 1998 (KR) ............................................. 98-35131

(51) Int. Cl.⁷ .......................... H04N 9/73; H04N 1/46; G03F 3/08; G06K 9/34; G06K 9/00
(52) U.S. Cl. ............................. 348/223.1; 348/225.1; 348/228.1; 358/516; 358/518; 382/164; 382/165; 382/167; 382/274
(58) Field of Search .................. 348/223.1, 224.1, 348/225.1, 226.1, 227.1, 228.1, 655; 358/516, 518; 382/162, 164, 165, 167, 274

(56) References Cited

U.S. PATENT DOCUMENTS

| | | | | |
|---|---|---|---|---|
| 5,045,928 A | * | 9/1991 | Takaiwa et al. | 348/227.1 |
| 5,223,921 A | * | 6/1993 | Haruki et al. | 348/655 |
| 5,274,440 A | * | 12/1993 | Miyazaki | 348/655 |
| 5,282,022 A | * | 1/1994 | Haruki et al. | 348/223.1 |
| 5,298,979 A | * | 3/1994 | Kim | 348/655 |
| 5,319,449 A | * | 6/1994 | Saito et al. | 348/223.1 |
| 5,430,482 A | * | 7/1995 | Kim | 348/333.01 |
| 5,448,502 A | * | 9/1995 | Kindo et al. | 382/165 |
| 5,489,939 A | * | 2/1996 | Haruki et al. | 348/223.1 |
| 5,555,022 A | * | 9/1996 | Haruki et al. | 348/223.1 |
| 5,568,194 A | * | 10/1996 | Abe | 348/223.1 |
| 5,606,630 A | * | 2/1997 | Maeda et al. | 382/254 |
| 5,644,358 A | * | 7/1997 | Miyano et al. | 348/223.1 |
| 5,644,359 A | * | 7/1997 | Ito | 348/223.1 |
| 5,659,357 A | * | 8/1997 | Miyano | 348/223.1 |
| 5,831,672 A | * | 11/1998 | Takei | 348/225.1 |
| 6,108,037 A | * | 8/2000 | Takei | 348/224.1 |
| 6,181,374 B1 | * | 1/2001 | Saito et al. | 348/223.1 |

FOREIGN PATENT DOCUMENTS

JP        2000092510 A  *  3/2000  ............ H04N/9/73

* cited by examiner

*Primary Examiner*—Andrew Christensen
*Assistant Examiner*—Brian Genco
(74) *Attorney, Agent, or Firm*—Sughrue Mion, PLLC

(57) ABSTRACT

A method of correcting white balance in a video camera is provided, which controls the red gain and blue gain of a captured image signal to allow the average of color difference signals of a picture, the method including the steps of (a) dividing the captured image of one picture into a predetermined number of unit cells, and accumulating the color difference signals by cells divided, (b) extracting an effective cell according as the accumulated data of each of the unit cells is data required for white balance correction or not, (c) judging whether data of the effective cell extracted in step (b) is monochrome data or mixed color data, (d) performing white balance correction without using the effective cell when the data of the effective cell is judged to be mixed color data in step (c), and (e) carrying out white balance correction using the effective cell when the data of the effective cell is judged to be monochrome data in step (c).

9 Claims, 9 Drawing Sheets

(A) AF data (B) Weight (A) Distance Difference (B) Weight

METHOD OF CORRECTING WHITE BALANCE IN VIDEO CAMERA

BACKGROUND OF THE INVENTION

1. Field of the Invention

The present invention relates to a method of correcting white balance in a video camera, and more particularly, to a method of correcting white balance in a video camera, in which it is judged whether data accumulated in each of unit cells of an input image signal is mixed color data when white balance correction is carried out for the input image signal, and the judged result is reflected in the correction process, thereby enabling more accurate white balance correction.

2. Discussion of Related Art

In general, a video camera is divided into color and monochrome types according as it recognizes colors or not, and classified into types for recording/storage (for home use and broadcasting use) and for monitoring according to its use. The video camera for recording/storage is called camcorder which usually includes camera, recording/playback part and monitor in a unit case. On the other hand, in the monitoring video camera system, its camera is separated from its recording/playback part and monitor. Accordingly, the video camera in the monitoring system generally means the camera other than the recording/playback part. In this specification, "video camera" is used as a term which means the color video camera for recording/storage, that is, the camera of color camcorder, and color video camera for monitoring.

A video signal generated by the image capture device of the video camera passes through various signal processing steps, for example, automatic focus (AF) control or blooming prevention process, to be outputted to the monitor and VCR. These signal processing steps also include white balance correction. A method of correcting white balance is disclosed in, for example, U.S. Pat. No. 4,736,241 (Apr. 5, 1988) which proposed a hardware arrangement for detecting the variation in color temperature of illumination source of light from the color difference signal provided by the image capture device of the video camera and for processing red and blue signals according to the detected signal, thereby automatically controlling white balance.

The white balance correction in the video camera is called a function of automatically controlling the red gain and blue gain to allow the average of color difference signals r–y and b–y for the entire picture to be zero. Human eyes correctly perceive a white object to be white without regard to the variation in color temperature, for example, the variation from the blue light of autumn sky to the red light of the evening glow. However, the video camera using electric signals cannot provide the adaptability the human eyes have. Specifically, when the video camera takes a picture of a white object in the lightning of 3000[°K], and then takes a picture of the same object again in the lightning of 5000[°K] while the red gain and blue gain are controlled to allow the object pictured first to be seen white on the monitor, the object displayed on the monitor is seen blue not white. The white balance correction is used for solving this problem the video camera has.

A conventional method of processing the white balance correction in software includes the steps of, in the state that data corresponding to one picture captured is divided into a predetermined number of unit cells, accumulating color difference signals by unit cells, selecting an effective cell using blackbody radiation curve, and allowing the average of the color difference signals of the selected effective cell to be zero. However, the aforementioned conventional method of correcting the white balance in a video camera carries out white balance correction without judging whether the color of the effective cell is monochrome or mixed color, bringing about inaccurate processing result.

SUMMARY OF THE INVENTION

Accordingly, the present invention is directed to a method of correcting white balance in a video camera that substantially obviates one or more of the problems due to limitations and disadvantages of the related art.

An object of the present invention is to provide a method of correcting white balance in a video camera, in which, for each of unit cells a picture, it is judged whether its color is monochrome or mixed color on the basis of automatic focus data or the correlation between corresponding cell and its neighboring cells and the judged result is reflected in white balance correction, enabling more accurate white balance correction process.

To accomplish the object of the present invention, there is provided a method of correcting white balance in a video camera, which controls the red gain and blue gain of a captured image signal to allow the average of color difference signals of a picture, the method including the steps of (a) dividing the captured image of one picture into a predetermined number of unit cells, and accumulating the color difference signals by cells divided, (b) extracting an effective cell according as the accumulated data of each of the unit cells is data required for white balance correction or not, (c) judging whether data of the effective cell extracted in step (b) is monochrome data or mixed color data, (d) performing white balance correction without using the effective cell when the data of the effective cell is judged to be mixed color data in step (c), and (e) carrying out white balance correction using the effective cell when the data of the effective cell is judged to be monochrome data in step (c).

In the aforementioned method, the judgment whether data accumulated in each of the unit cells is data required for white balance correction or not is carried out according as the accumulated data exists in a predetermined region including blackbody radiation curve. The judgement whether data of the effective cell is monochrome data or mixed color data in step (c) is carried out according to the amount of AF data corresponding cell has or the correlation between corresponding cell and its neighboring cells.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

Figure 5:
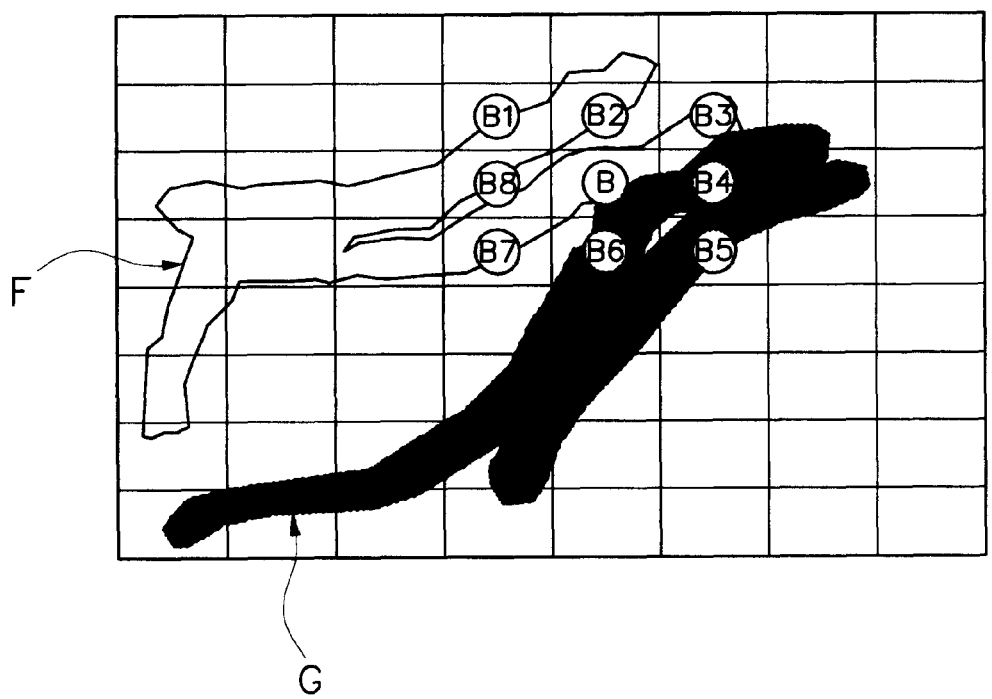
Figure 6:
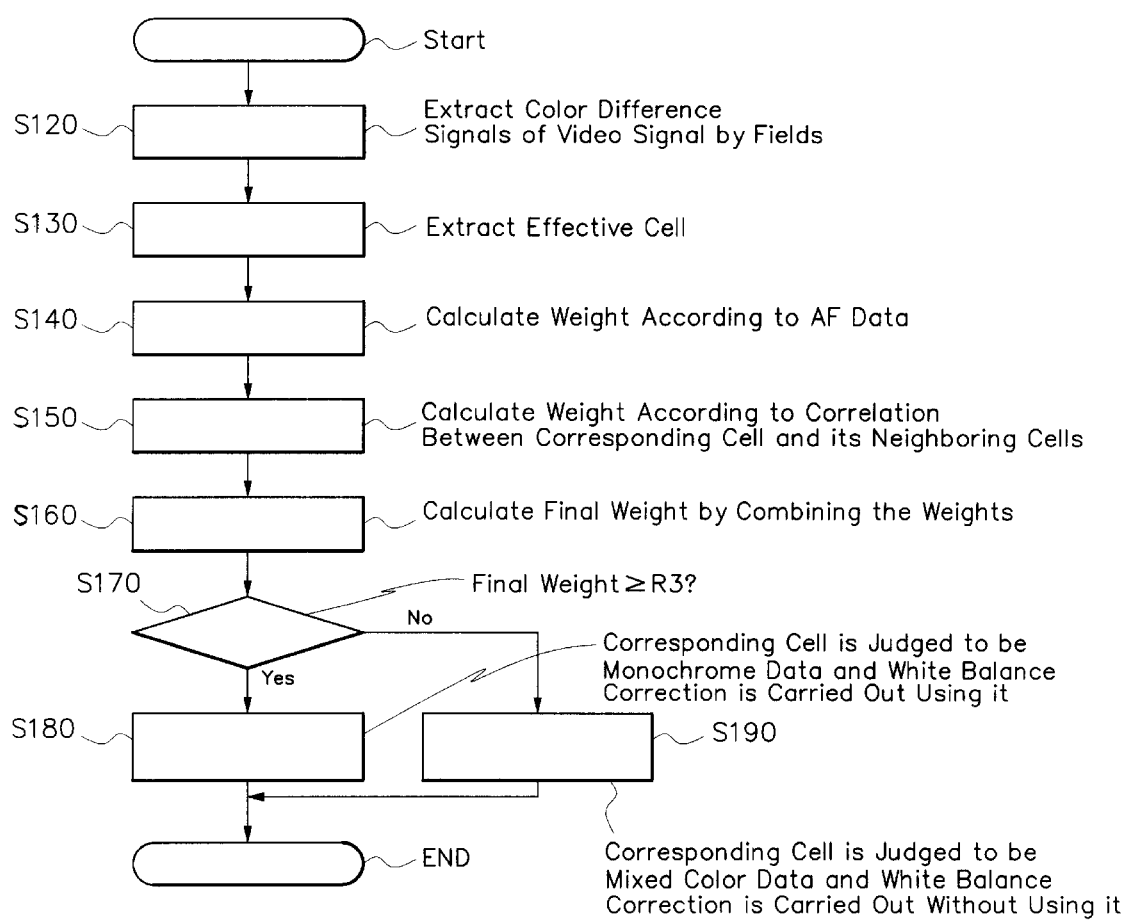
Figure 7:
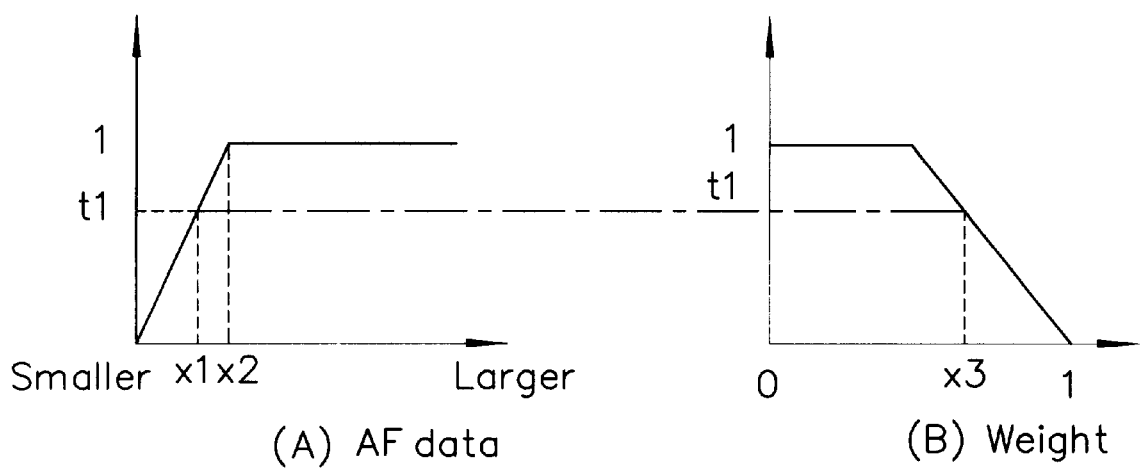
Figure 8:
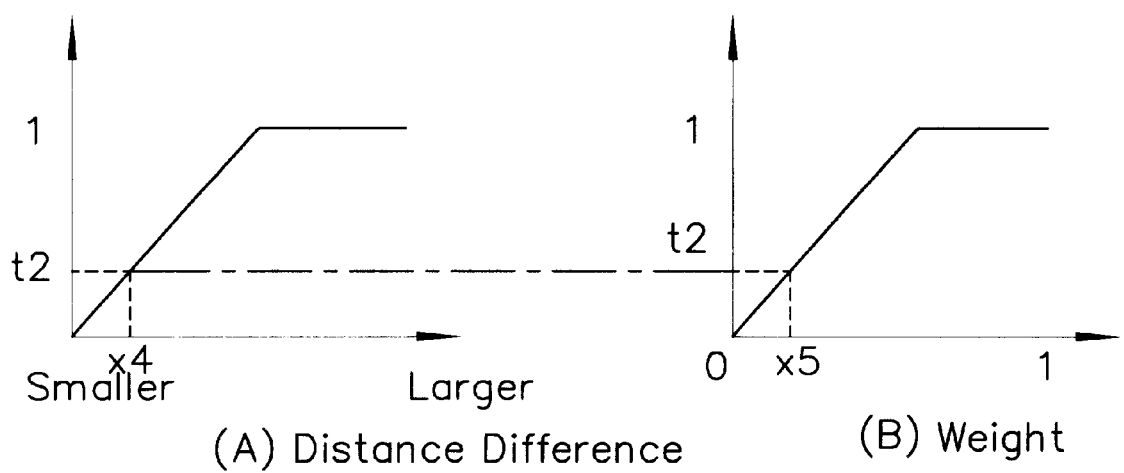
Figure 9:
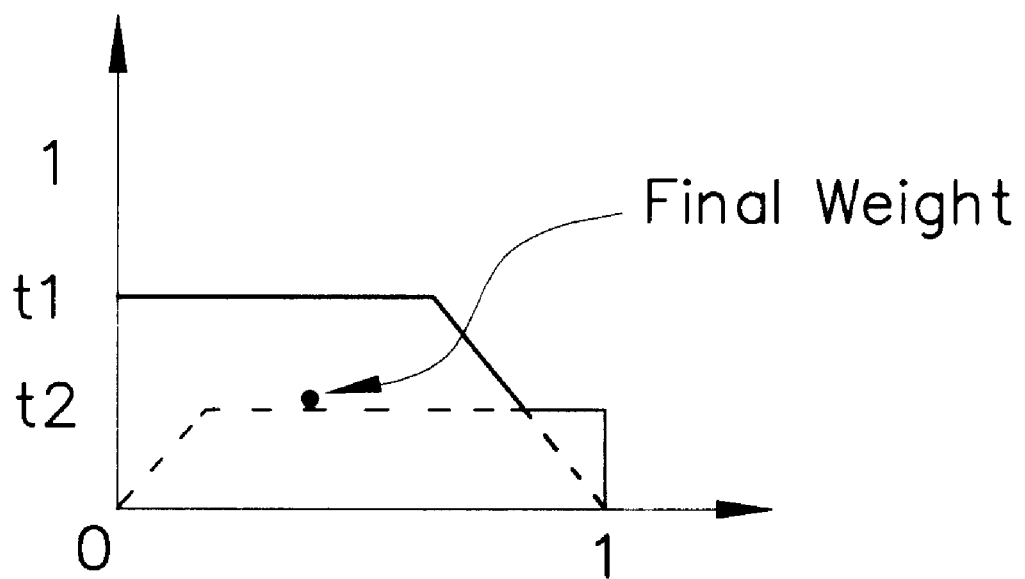

FIG. 5 illustratively shows the composition of a picture corresponding to one field for the purpose of explaining the method of correcting white balance in a video camera according to the present invention;

FIG. 6 is a flowchart of showing a method of correcting white balance in a video according to another embodiment of the present invention;

FIG. 7 is a diagram for explaining a process of calculating the weight according to AF data in FIG. 6;

FIG. 8 is a diagram for explaining a process of calculating the weight according to the correlation between corresponding cell and its neighboring cells in FIG. 6; and FIG. 9 is a diagram for explaining a process of calculating the final weight in FIG. 6.

DETAILED DESCRIPTION OF PREFERRED EMBODIMENT

Methods of correcting white balance in a video camera according to preferred embodiments of the present invention are described below in detail with reference to the attached drawings.

Figure 1:
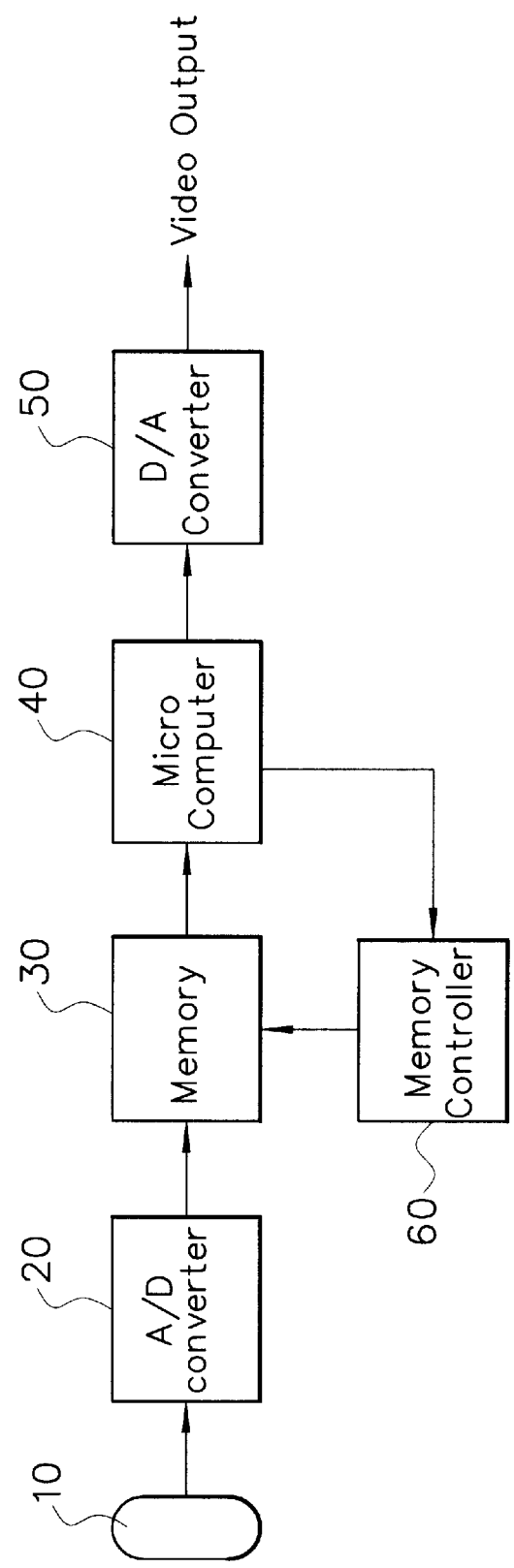
FIG. 1 is a block diagram of a video camera to which the present invention is applied.

FIG. 1 is a block diagram of a video camera to which the present invention is applied. Referring to FIG. 1, the video camera of the present invention includes an image capture section 10 for converting rays of light entering through a lens (not shown) into an electric signal that is an analog video signal, an A/D converter 20 for converting the electric signal captured by image capture section 10 into a corresponding digital video signal, a memory 30 for storing the digital video signal by one frame or one field, a memory controller 60 for controlling reading and writing of the digital video signal from/to memory 30, a D/A converter 50 for converting the digital video signal read from memory 30 into an analog video signal, and a microcomputer 40 for controlling the entire operation of the video camera including white balance correction. In this arrangement, image capture section 10 is preferably configured of a charge coupled device. In the following description, memory 30 stores the picture unit of one field.

Figure 2:
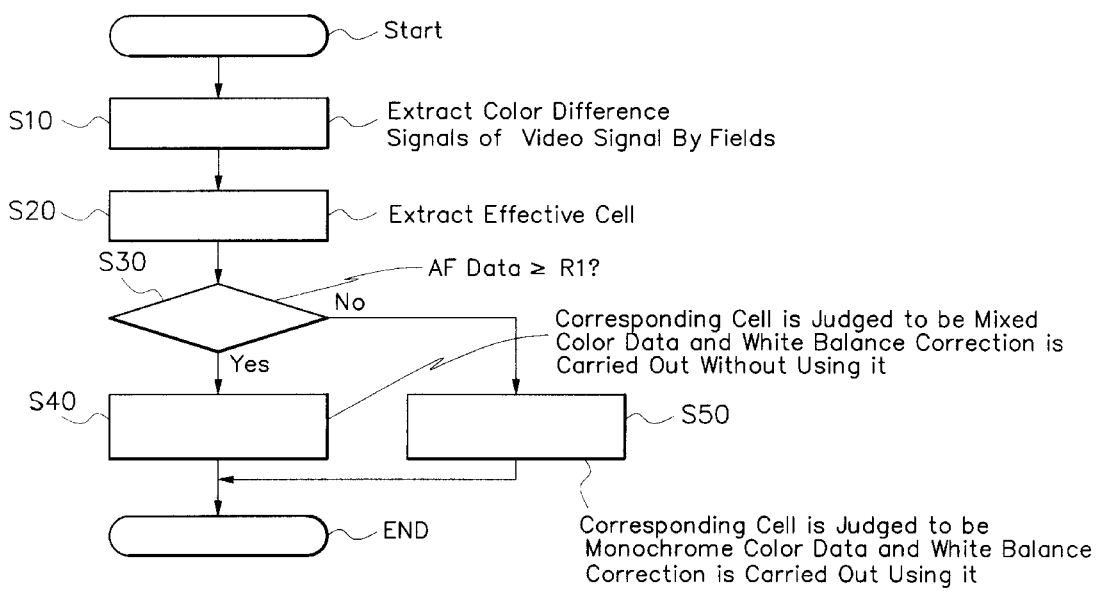
FIG. 2 is a flowchart of showing a method of correcting white balance in a video camera according to an embodiment of the present invention.
Figure 3:
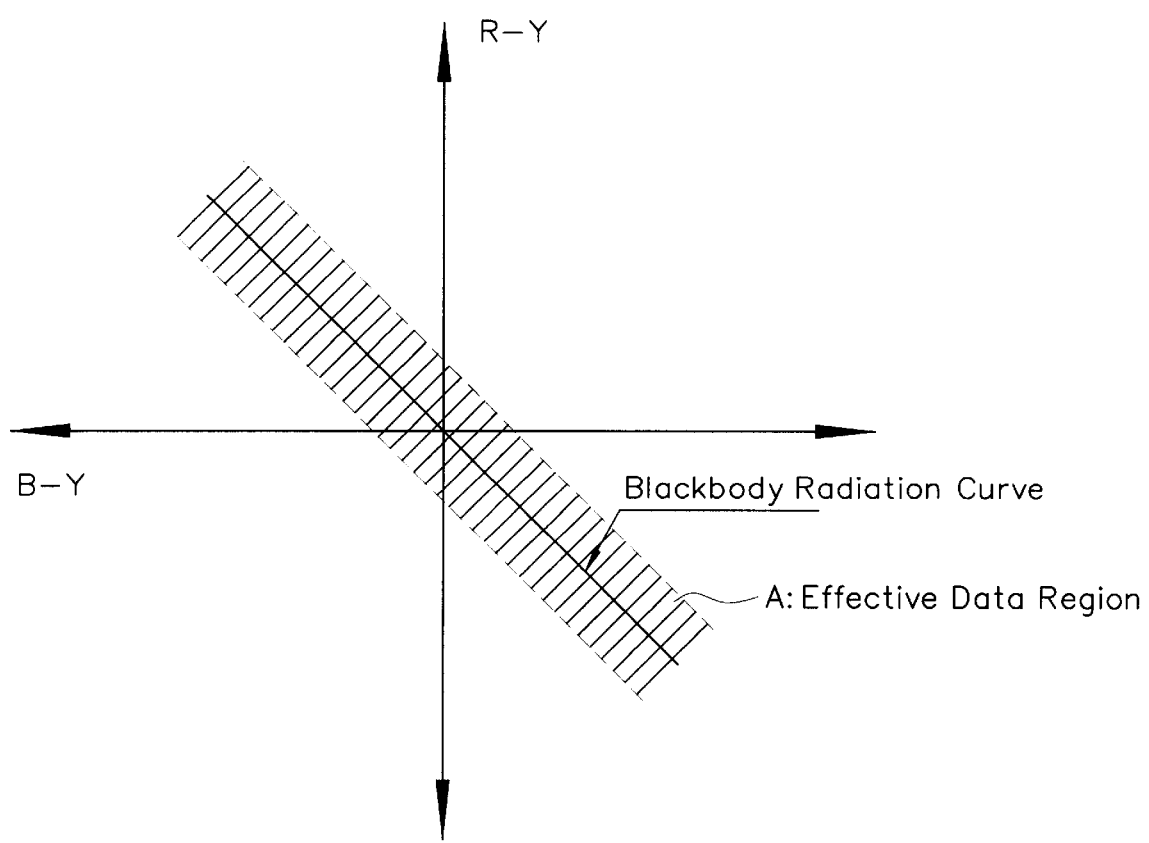
FIG. 3 shows blackbody radiation curve used for extracting an effective cell in the method of correcting white balance in a video camera according to the present invention.

FIG. 2 is a flowchart of explaining a method of correcting white balance in a video camera according to an embodiment of the present invention, FIG. 3 shows blackbody radiation curve used for extracting an effective cells in the method of correcting white balance in a video camera of the present invention, and FIG. 5 illustratively shows the composition of a picture corresponding to one field for the purpose of explaining the method of correcting white balance in a video camera according to the present invention. In the method of correcting white balance in a video camera in accordance with one embodiment of the present invention as shown in FIG. 2, luminance signal (y) and color difference signals (r-y) and b-y are extracted by fields from a video signal which was captured by the image capture section and then converted into a digital signal by A/D converter 20 in step S10. Both the luminance signal (y) and color difference signals (r-y) and (b-y) are accumulated during the period of one field, and then read when the next signals corresponding to the following filed are inputted in the video camera. In this process, as shown in FIG. 5, the entire picture is divided into a predetermined number of unit cells, for example, 64 unit cells, the color difference signals (r-y) and (b-y) are accumulated and then read by unit cells divided.

In step S20, an effective cell is extracted according as data of each unit cell, read in step S10, is effective data required for correcting white balance or not. Here, the judgement whether the data of each unit cell is effective data may be preferably performed using the blackbody radiation curve of FIG. 3. The blackbody radiation curve of in FIG. 3 shows the distribution of a source of light according to color temperatures. Only data which exists in a predetermined region A including the blackbody radiation curve is judged to be the effective data required for correcting white balance. The predetermined region A may be preferably set by a physical experiment.

In step S30, for each cell judged to be effective in step S20, filtering is carried out for the purpose of judging whether data accumulated in the effective cell is monochrome data or mixed color data. In this embodiment, step S30 is performed according as the amount of AF data of corresponding cell exceeds a predetermined reference value R1 or not. This is because larger amount of AF data means higher probability that the boundary of an object exists in the corresponding cell since many high frequency component generates in the boundary of the object, and also means stronger probability that objects having different colors are located in the corresponding cell.

When the amount of AF data is larger than reference value R1 in step S30, the process goes to step S40 where the data of corresponding cell is regarded as mixed color data and this data is removed in white balance correction. On the other hand, when the amount of AF data is lower than reference value R1 in step S30, the process proceeds to step S50 where the data of corresponding cell is regarded as monochrome data and white balance is corrected using this data. That is, the red gain and blue gain are controlled to allow the average of color difference signals (r-y) and (b-y) of the cell having only monochrome data which is effective in current field to be zero.

Figure 4:
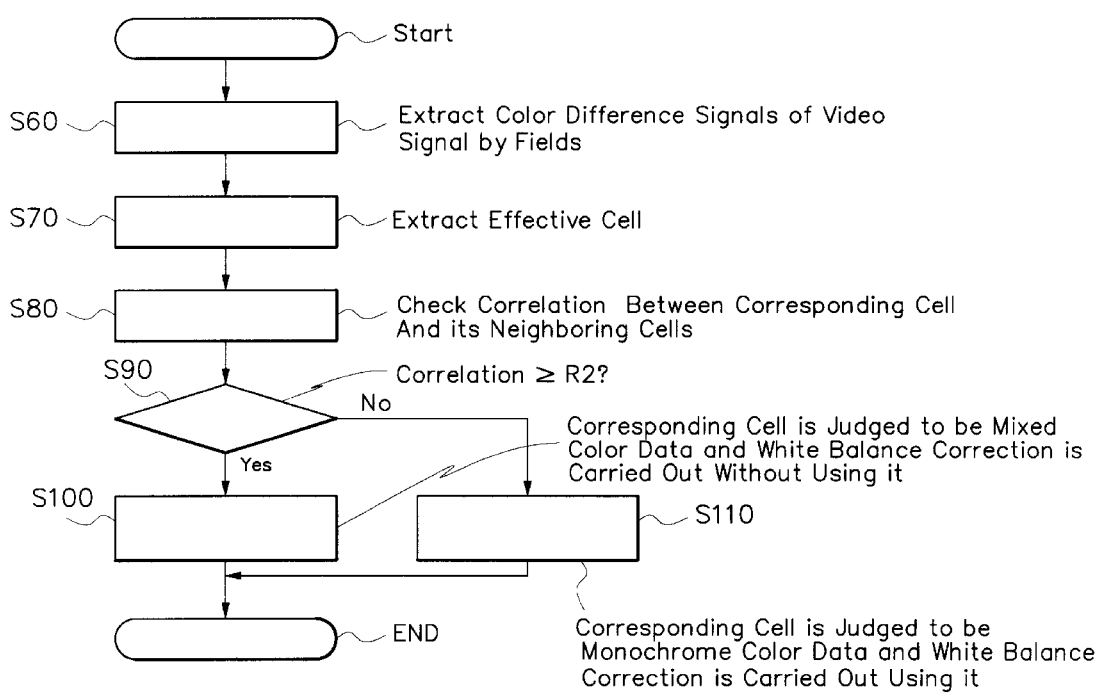
FIG. 4 is a flowchart of showing a method of correcting white balance in a video according to another embodiment of the present invention.

FIG. 4 is a flowchart of a method of correcting white balance in a video camera according to another embodiment of the present invention. In this embodiment, steps S60 and S70 may be performed in the same manner for use in the aforementioned embodiment of FIG. 2. Step S80 checks the correlation between corresponding cell and its neighboring cells. In other words, in the example of FIG. 5, the correlation between corresponding cell B and its neighboring cells B1 to B8 is obtained. Specifically, the vector sum of color difference signals (r-y) and (b-y) of cells B2, B6, B8 and B4 which are placed in the upper, lower, left and right sides of corresponding cell B, respectively, which is referred to as vector sum of neighboring cells hereinafter, is obtained, and the resulting vector sum and vector sum of the corresponding cell's own color difference signals (r-y) and (b-y), which is referred to as vector sum of corresponding cell, are compared to each other, obtaining the correlation.

If an object F placed in the upper part of FIG. 5 is yellow and object G placed in its lower part is magenta, for example, these colors are mixed to make center cell B muddy red. Due to the mixture of colors of objects F and G, the mixed color of cells B2 and B6 located in the upper and lower sides of cell B and mixed color of cells B8 and B4 placed in the left and right sides of cell B also have muddy red, thereby increasing the correlation between cell B and its neighboring cells. As a result, the probability that the color of corresponding cell is mixed color becomes higher when the correlation between the corresponding cell and its neighboring cells is larger, in other words, the distance difference between the vector sums is smaller. In step S90, the correlation obtained in step S80 is compared with a predetermined reference value R2. When the correlation is larger than reference value R2, the process goes to step S100 where the data of corresponding cell is regarded as mixed color data and white balance correction is performed with the data removed. On the other hand, the correlation is lower than reference value R2, white balance is corrected using the data.

FIG. 6 is a flowchart of a method of correcting white balance in a video camera according to another embodiment of the present invention. This embodiment puts the above embodiments of FIGS. 2 and 4 together. First, steps S120 and S130 are carried out in the same manner for use in steps S10 and S20 of FIG. 2. Then, the weight as the effective data the corresponding data has is calculated on the basis of the amount of AF data of the corresponding cell in step S140.

FIG. 7 is a diagram for explaining the process of calculating the weight according to AF data in FIG. 6. In FIG. 7, graphs (a) and (b) show a curve of increase in the amount of AF data and corresponding weight curve, respectively. As shown in FIG. 7, when the amount of AF data of corresponding cell is larger than ×2, it has the value of 1 (normalized value) which is the saturation state and the weight has also saturation state of 1 (normalized value). When the amount of AF data of corresponding cell equals ×1, corresponding weight has the value of ×3.

Step S150 calculates the weight according to the correlation between corresponding cell and its neighboring cells. FIG. 8 is a diagram for explaining the process of calculating the weight according to the correlation between corresponding cell and its neighboring cells in FIG. 6. In FIG. 8, graphs (a) and (b) show the distance difference between the vector sums of corresponding cell and its neighboring cells and corresponding weight curve, respectively. As described above, the larger the distance difference between the vector sum of corresponding cell and vector sum of its neighboring cells, the lower the correlation. This increases the weight as the effective data. Referring to FIG. 8, when the distance difference between the vector sum of corresponding cell and vector sum of its neighboring cell equals ×4, the weight is ×5.

In step S160, the weights calculated in steps S140 and S150 are combined to calculate the final weight. FIG. 9 is a diagram for explaining the process of calculating the final weight in FIG. 5. In step S160, as shown in FIG. 9, the area in the weight graph of FIG. 7(B), placed below t1 that is the vertical axis value of ×1 indicating the amount of AF data in FIG. 7(a), is superposed on the area in the weight graph of FIG. 8(b), placed below t2 that is the vertical axis value of ×4 indicating the distance difference between the vector sums of corresponding cell and its neighboring cells in FIG. 8(a), and the centers of these areas are obtained, to calculate the final weight.

In step S170, the final weight obtained in step S160 is compared with a predetermined reference value R3. When the final weight exceeds reference value R3, the data of corresponding cell is judged to be monochrome data, proceeding to step S180 where white balance correction is performed using the corresponding cell. On the other hand, when the final weight is lower than reference value R3, the data of corresponding cell is judged to be mixed color data, proceeding to step S190 where white balance correction is carried out without using corresponding cell.

It will be apparent to those skilled in the art that various modifications and variations can be made in the method of correcting white balance in a video camera of the present invention without departing from the spirit or scope of the invention. For example, the white balance correction may be carried out for cells corresponding to one frame not one field (it is refereed to as one picture in the following claims) Furthermore, the number of unit cells may be changed. The reference values R1, R2 and R3 and slopes and saturation points of the graphs of FIGS. 7 and 8 can be experimentally determined, and the calculation of the final weight can be realized by other methods not the above center method.

Moreover, the effective cell may be judged by a method of sequentially using AF data and correlation between corresponding cell and its neighboring cells. In this case, for a cell judged to be a effective cell according to the amount of AF data, the correlation with its neighboring cells is checked, to finally take the cell as an effective cell only when the correlation corresponds to a predetermined reference value. The neighboring cells used in calculation of the correlation can be the cells placed on the diagonal line across corresponding cell instead of the cells placed in the upper, lower, left and right sides of the corresponding cell, or it can be all the cells adjacent to the corresponding cell.

As described above, according to the method of correcting white balance in a video camera of the present invention, it is judged whether the color of each of unit cells constructing a picture is monochrome or mixed color on the basis of automatic focus data or the correlation between corresponding cell and neighboring cells, and the judged result is reflected in white balance correction, enabling more accurate white balance correction process.

What is claimed is:

1. A method of correcting white balance in a video camera, which controls the red gain and blue gain of a captured image signal to allow the average of color difference signals of a picture, the method comprising the steps of:
   (a) dividing the captured image of one picture into a predetermined number of unit cells, and accumulating the color difference signals by cells divided;
   (b) extracting an effective cell according as the accumulated data of each of the unit cells is data required for white balance correction or not;
   (c) judging whether data of the effective cell extracted in step (b) is monochrome data or mixed color data;
   (d) performing white balance correction without using the effective cell when the data of the effective cell is judged to be mixed color data in step (c); and
   (e) carrying out white balance correction using the effective cell when the data of the effective cell is judged to be monochrome data in step (c).

2. The method as claimed in claim 1, wherein the judgment whether the data accumulated in each of the unit cells is data required for white balance correction or not in step (b) is carried out according as the accumulated data exists in a predetermined region including blackbody radiation curve.

3. The method as claimed in claim 2, wherein the judgement whether data of the effective cell is monochrome data or mixed color data in step (c) is carried out according to the amount of AF data corresponding cell has.

4. The method as claimed in claim 3, wherein, for a cell whose data is judged to be monochrome data on the basis of the amount of AF data, the correlation between the cell and its neighboring cells is checked, and it is finally judged whether the data of the cell is monochrome data or mixed color data according to the checked result.

5. The method as claimed in claim 4, wherein the correlation between corresponding cell and its neighboring cells is calculated on the basis of the distance difference between vector sum of color difference signal data accumulated in the corresponding cell and vector sum of color difference signal data of neighboring cells located in the upper, lower, left and right sides of the corresponding cell.

6. The method as claimed in claim 2, wherein the judgement whether data of the effective cell is monochrome data or mixed color data in step (c) is carried out according to the correlation between corresponding cell and its neighboring cells.

7. The method as claimed in claim 6, wherein the correlation between corresponding cell and its neighboring cells is calculated on the basis of the distance difference between vector sum of color difference signal data accumulated in the corresponding cell and vector sum of color difference signal data of neighboring cells located in the upper, lower, left and right sides of the corresponding cell.

8. The method as claimed in claim 2, wherein the judgement whether data of the effective cell is monochrome data or mixed color data in step (c) is carried out by combining the weight as effective data on the basis of the amount of AF data of corresponding cell with the weight as effective data that the correlation between corresponding cell and its neighboring cells has, to calculate the final weight, and then comparing the final_weight with a predetermined reference value.

9. The method as claimed in claim 1, wherein the number of the unit cells equals 64.

\* \* \* \* \*